United States Patent [19]

Dunson, Jr. et al.

[11] 3,969,094

[45] July 13, 1976

[54] FLUE GAS SCRUBBER

[75] Inventors: James B. Dunson, Jr.; Robert L. Lucas, both of Newark, Del.

[73] Assignee: E. I. Du Pont de Nemours and Company, Wilmington, Del.

[22] Filed: Dec. 11, 1973

[21] Appl. No.: 423,728

[52] U.S. Cl. .............................. 55/242; 55/257 R; 261/114 R; 261/DIG. 9
[51] Int. Cl.² ........................................ B01D 47/06
[58] Field of Search ........... 261/108, 109, 110, 111, 261/112, 113, 114 R, 126, 119, 121, 123, 124, DIG. 54, DIG. 9; 55/240, 241, 242, 255, 256, 257, 441, 73, 225; 23/283, 284; 423/242

[56] References Cited
UNITED STATES PATENTS

| | | | |
|---|---|---|---|
| 100,766 | 3/1870 | Huntington | 261/114 R |
| 846,499 | 3/1907 | Murray | 261/113 |
| 1,146,014 | 7/1915 | Mewborne | 261/114 R UX |
| 1,162,969 | 12/1915 | Beyer | 55/257 X |
| 1,182,544 | 5/1916 | Ferguson | 261/113 X |
| 1,957,094 | 5/1934 | Byer | 261/114 R |
| 2,007,759 | 7/1935 | Harmon | 261/113 X |
| 2,116,933 | 5/1938 | Ragatz | 261/113 X |
| 2,201,502 | 5/1940 | Pyle | 261/113 |
| 2,387,345 | 10/1945 | Pearl | 261/126 |
| 2,390,430 | 12/1945 | Dons | 23/270.5 |
| 2,682,394 | 6/1954 | Guthrie et al. | 261/113 |
| 2,736,541 | 2/1956 | Maiman | 261/126 |
| 3,057,605 | 10/1962 | Stone | 261/DIG. 54 |
| 3,527,026 | 9/1970 | Miura | 55/236 |
| 3,533,608 | 10/1970 | McClure | 261/109 |
| 3,593,497 | 7/1971 | Grimm et al. | 55/250 |
| 3,795,486 | 3/1974 | Ekman | 423/242 X |
| 3,859,063 | 1/1975 | Porter et al. | 55/233 |

FOREIGN PATENTS OR APPLICATIONS

| | | | |
|---|---|---|---|
| 45,132 | 11/1961 | Poland | 55/257 |
| 234,754 | 2/1945 | Switzerland | 55/240 |
| 747,473 | 4/1956 | United Kingdom | 261/112 |
| 572 | 1/1908 | United Kingdom | 261/111 |
| 289,118 | 4/1928 | United Kingdom | 261/111 |
| 247,227 | 5/1967 | U.S.S.R. | 261/111 |

OTHER PUBLICATIONS

O'Donnell et al. – Heat Transfer by Dir. Contact between Liquid & Vapor. In Chem Eng. Prog. vol. 47 No. 6 dtd. 6/51, pp. 309–314.

*Primary Examiner*—Bernard Nozick

[57] ABSTRACT

Baffle tray columns can be designed and operated so to function as highly efficient scrubbers for the cleaning of flue gases subject to wide variations in flow. The columns are designed and operated such that areas within the scrubbing area operate with a liquid phase continuous froth as the contacting medium. The columns can also contain an integral non-clogging separator for entrainment control.

6 Claims, 7 Drawing Figures

FLUE GAS SCRUBBER

BACKGROUND OF THE INVENTION

Scrubbers for the removal from gases of reactive vapors or sticky particulate contaminants require non-clogging designs with substantial liquid holdup and essentially no entrainment. Use of slurries for scrub liquids adds considerably to the potential for disruption of scrubber performance due to entrainment and growth of massive deposits.

Baffle tray towers have been used for dirty vapor-liquid gas absorption and heat transfer for a long time, e.g., as the ammoniated brine carbonation tower of the Solvay process and as contact condensers for contaminated steam. However, to our knowledge they have not been designed for use alone as scrubbers for the simultaneous removal of gaseous contaminants and particulates from gas streams, particularly hot flue gases.

SUMMARY OF THE INVENTION

We have discovered that a baffle tray column can be designed and operated in such a way as to be a practical scrubber by itself for cleaning flue gases over a wide range of gas and liquid feed rates.

In the apparatus of the invention the liquid rate into the column is modulated as required by the gas flow to maintain a region or regions within the scrubbing area of the column, i.e., the baffle tray area, in a froth condition where the liquid phase is continuous. This allows direct control both of pressure drop and of cleaning efficiency for gases and particles independent of changes in gas throughput. Thus there can be substantial capacity turnup/turndown with no change in scrubbing performance. The column can be used in applications where the gas flow can change substantially, e.g., 50 to 150%, especially where a slurry is used or there is a heat load involved, such as in boiler or incinerator flue gas scrubbing.

The baffle tray column of the invention can also contain an integral separator for entrainment control.

The invention is also capable of operation over extended periods of time without encouraging scaling or plugging, thus reducing or eliminating restriction of flow and pressure drop problems. The baffle tray column of the invention thus becomes very useful for the scrubbing of flue gases, particularly hot flue gases.

DESCRIPTION OF THE INVENTION

Figure 1:
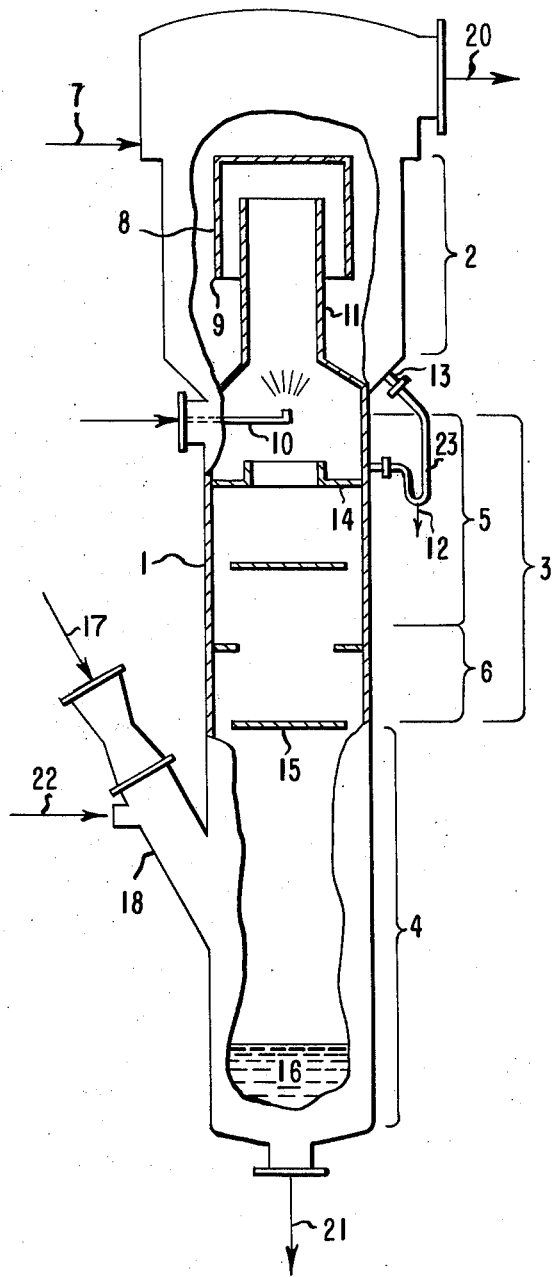
FIG. 1 is a cross-sectional view of an embodiment of the scrubbing column of the invention.

The apparatus of the invention can be used to remove reactive gaseous and/or sticky particulate contaminants from a wide variety of flue gas streams, e.g., such gas streams as those from ore acidulation, e.g., HF manufacture; metal oxide chlorination, e.g., $TiO_2$ manufacture; sulfide oxidation, e.g., fuel combustion; and scrap incineration, e.g., incineration of solids or liquid still bottoms. The invention is particularly useful in treating hot gas streams, e.g., 200° to 1200°C, which have rapid changes in gas flow, e.g., flue gas streams from boilers or incinerators.

Baffle tray columns in ordinary design practice are used mainly for direct contact gas/liquid heat transfer service where one or both phases contains materials (e.g., tar) which would tend to plug heat exchangers, spray nozzles, or conventional tray column internals. Liquid is dispersed as a spray in a continuous gas phase; pressure drop is small; and any gas cleaning which occurs is incidental [see, e.g., "Chemical Engineers' Handbook", 5th Edition (1973), pages 18–5 and 18–51.] Gas and liquid flows are ordinarily set independently by process considerations, and the column is sized to handle them without approaching closer than to about 70% of flooding. Operation closer to flooding is subject to massive fluctuations in liquid holdup and pressure drop due to small changes in liquid or gas flow rate.

We have discovered that columns designed in accordance with this invention can be operated right up to and through flooding without loosing control of pressure drop, and that the high pressure drop characteristic of such operation is accompanied by excellent mass transfer and particle collection characteristics. Such a baffle tray scrubber alone can perform better than can the combination of a Venturi scrubber followed by a sieve tray tower that would otherwise be required for cleaning hot gases containing both gaseous and particulate contaminants. Approach to the desired condition is characterized by a sudden increase in pressure drop, as part of the column shifts from gas-phase-continuous spray operation to liquid-phase-continuous froth operation. With columns designed in accordance with the invention, the increase in pressure drop is relatively small, and the fraction of the column in froth operation is stable and controllable over a wide range of liquid and gas flows.

Fractional collection efficiency for particles is a function of particle size, and probably of particle density, gas viscosity, and particle wettability as well. Fractional efficiency as a function of pressure drop is similar to that of a Venturi scrubber.

The gaseous contaminants that can be removed will depend upon the composition of the liquid scrubbing stream. Thus, if this stream contains alkali such as limestone or lime, acid gases can be treated, i.e., $SO_2$ can be removed from the gas. If the stream contains an acid such as $HNO_3$, alkaline gases such as amines can be scrubbed. If the stream contains a reducing agent such as $NaHSO_3$, oxidizing gases such as $Cl_2$ can be scrubbed. If the stream contains an oxidizing agent such as $FeSO_3$, reducing gases such as $H_2S$ can be scrubbed. Typical contaminants that can be removed include $H_2SO_4$ mist or vapor, $SO_2$, $S_8$, $H_2S$, $Cl_2$, HCl mist or vapor, $SiCl_4$, HF, $NH_3$, caprolactam and many others. Useful scrubbing streams can be aqueous, with sulfuric acid and suspended solids, dilute HCl or alkali such as limestone; or nonaqueous, such as mineral oil or even molten sulfur.

In the preferred embodiment of the invention the process and apparatus are used to remove $SO_2$ and particulates from a hot flue gas using a limestone scrubbing stream. The process of the invention enables the $SO_2$ content of a gas stream to be reduced from above 2000 ppm to below 200 ppm with the scrubbing slurry and a pressure drop of 4 to 16 inches of water. At the same time particulates can be reduced from above 5 grains/standard cubic foot to below 0.05 grains/standard cubic foot.

In the preferred embodiment additional improvements in operation can be obtained if the sulfite concentration of the scrubbing stream is maintained between 300 to 1300 ppm by adjustment of the limestone feed. This technique is described in greater detail in application Ser. No. 423,727, filed even date this application by James B. Dunson, Jr. and entitled "Flue Gas Scrubbing System Control".

As set forth previously, this invention involves the unexpected discovery that baffle tray columns can be built and operated so as to function as highly efficient scrubbers for the cleaning of hot dirty gases subject to wide variations in flow, such as those from boilers or incinerators. The three key concepts are as follows: (1) certain parts of the column are designed to operate with a liquid phase continuous froth as the contacting medium; (2) the column contains an integral non-clogging separator for entrainment control; and (3) the liquid rate is varied to compensate for changes in the gas rate and maintain a froth condition.

These key concepts will now be explained with respect to the Drawings.

FIG. 1 is a cross-section of a baffle tray column of the disc-and-donut type. It should be understood that other types of baffle tray columns having either horizontal or sloped baffle trays, e.g., side-to-side type, could be employed in the process of the invention. The use of a baffle tray column has the further advantage in that no narrow restrictions are involved as with a packed column, thus plugging of the column is reduced or eliminated even if some scaling does occur due to operational errors. The design of the column is not critical; thus, it can be rectangular in cross section as well as circular.

The baffle tray scrubber of the invention is a vertical column 1 essentially divided into three areas, a de-entrainment area 2, a scrubbing area 3, and a bottom area 4. In the embodiment of FIG. 1 the scrubbing area 3 is further divided into a top portion 5 and a bottom portion 6.

The integral entrainment separator 8 illustrated is of the cap type. This type of de-entrainment means is preferred as it can accommodate a wet/dry interface without creating a plugging problem. Other type entrainment separator could be employed, such as a cyclone, or a zigzag vane type, or a mesh pad, the latter being preferred when there are no suspended solids in the gas stream. If desired, a cap entrainment separator containing a vaned annulus could be employed.

The liquid scrubbing stream 7 is introduced on the outside wall above the top of the cap type entrainment separator 8. The supply means is not critical and an overflow weir or a group of spray nozzles can be employed. The stream flows down the wall of the column past the cap as a falling film, thereby washing the outside wall so as to prevent the formation of a mud ring or a ring of crystal growth adjacent to the lower lip of the cap 9.

To avoid possible plugging problems, a smaller spray 10 of the scrubbing liquid can be used to wash away the solids that may collect on the riser 11 and the inside of the cap.

The liquid scrubbing stream drains 13 from the entrainment separator 8 down through a seal loop 23 to feed weir 14 on the top tray, from which it cascades down through the scrubbing area. A portion 12 may be drawn off to allow use of more liquid for wall washing than is needed for column operation at very high gas throughputs.

The scrubbing area 3 of this embodiment of the invention has the minimum free open area for flow at the top 5, with lower trays having progressively more free open area 6. Note, however, the progressive change in free open area need not be uniform This particular design allows smooth operation with whatever number of trays desired from the top of the column down in froth operation, while those below remain in spray operation. This concept, which provides control of normally unstable froth condition, allows higher liquid holdup and consequently much better gas scrubbing than is practical with other kinds of scrubbers suitable for hot slurry service.

It is not necessary that the froth condition be maintained in the top of the scrubbing area; it could be maintained at various zones throughout the area. In fact the entire scrubbing area could be operated under froth condition provided the gas flow can be controlled and will not increase unexpectedly. Preferably for stability, at least some portion of the scrubbing area is operating under spray conditions.

The important feature is that the froth condition be maintained in at least part of the scrubbing area, and this area be from the point of liquid addition downward. Thus in the embodiment illustrated in FIG. 5, a mid-column feed 25 is also employed and the froth condition is maintained both at the top of the column in area 5 and also in area 26. The use of a mid-column feed in conjunction with a top feed is a preferred embodiment of the invention. It is not necessary that the two liquids be the same, in which case a mid-column drawoff of liquid 24 may be used. This embodiment would be particularly useful to water scrub fly ash separately and prior to scrubbing $SO_2$ or the like with a regenerable absorbent such as $Na_2SO_3$, $MgSO_3$, citric acid, or FeS.

If desired, more than two liquid feed points could be employed. Thus, the liquid could be introduced into the scrubbing area at four or five different locations. Near each of these points of liquid introduction the froth condition would be maintained. The use of multiple liquid feeds has the advantage that the system can compensate for mal-distributions of gas and/or liquid.

The bottom tray 15 is a disc, which puts the liquid against the wall as a falling film as it drains to the bottom sump 16. If a side-by-side column is employed, the last side-by-side tray should be placed vertically opposite the gas inlet, with a small gap between it and the wall. This feature provides a wetted wall thus preventing crystal growth. Dirty gas 17 enters from an inclined nozzle 18 below the bottom tray of the column. This nozzle can impart a swirling motion to the gas stream; such a flow of gas and liquid will reduce plugging and scaling problems at the entrance. Heavy solids drop out into the liquid of the bottom sump 16 as the gas turns to go up through the column. The gas stream flows up through the column, moving radially in and out to pass the baffles. Cleaned gas is discharged above the top of the cap separator through the clean gas exit 20. The liquid collected in the bottom sump can be removed through the liquid exit 21. This liquid can then be reconstituted with fresh limestone and recycled to the column.

If desired, a portion of the liquid scrubbing stream 22, or merely an aqueous stream, can be introduced into the gas entrance nozzle 18 as a swirling film along the sides. This film of liquid will eliminate a buildup of solids at the wet/dry interface where the entrance enters the column, thus eliminating a plugging problem.

Although many materials of construction can be employed, preferably the areas in the column exposed to both the liquid scrubbing stream and the gas stream should be constructed of stainless steel, fiberglass reinforced plastic, or rubber lined steel.

In operation the gas stream, e.g., a hot flue gas containing $SO_2$, is fed into the entrance 18. Into this same entrance is fed a portion of the liquid scrubbing stream, i.e., a slurry containing about 10% by weight of suspended solids. The gas stream flows into the column in a downward direction and the liquid stream flows along the wall of the entrance as a swirling film. Upon entering the column the gas stream abruptly changes direction and flows upward through the column. This abrupt change in direction causes some of the particulates to fall into the liquid sump 16 at the bottom of the column. Generally, the particulates that will be removed in this area are those having a particle size above 100 microns.

Figure 5:
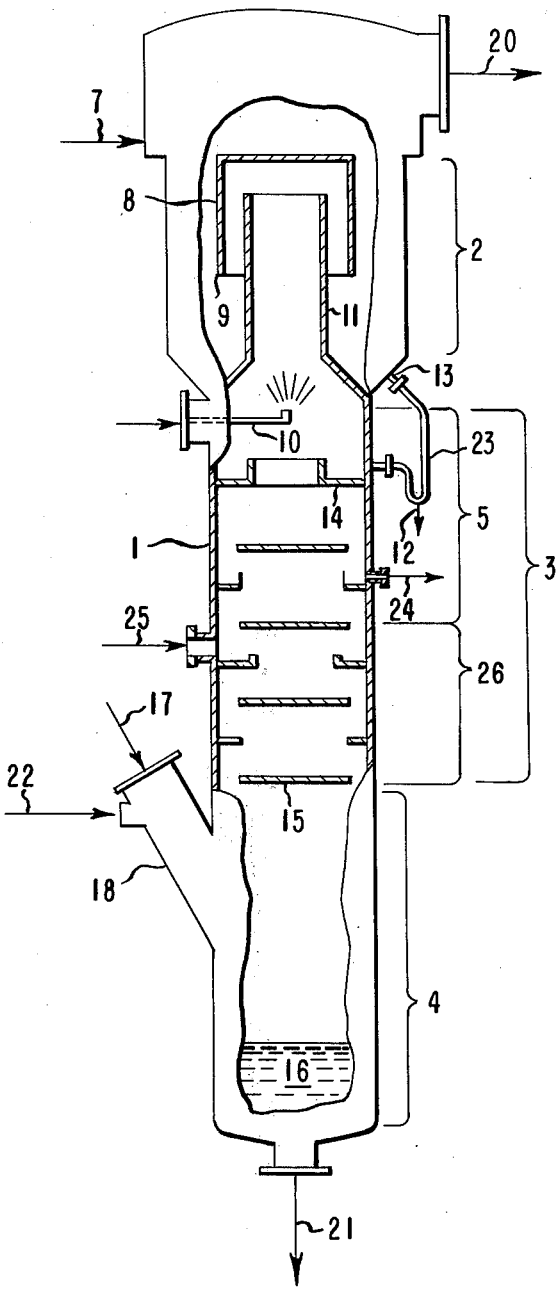
FIG. 5 is a cross-sectional view of another embodiment of the scrubbing column of the invention employing a mid-column feed.

In one embodiment the major portion of the liquid scrubbing stream 7 is fed into the top of the column. This stream flows down the walls of the column in the de-entrainment area thereby preventing a buildup of a mud ring. In other embodiments the major portion could be a mid-column feed as illustrated in FIG. 5, or multiple liquid feed points could be employed.

Within the de-entrainment area the gas stream, after having passed through the scrubbing area, flows upward through the riser 11 and makes several changes in direction in view of the design of the cap 8, and then exits the column at 20 as a clean gas. The abrupt changes in direction in the cap cause the entrained liquids to be removed from the gas stream and flow out the drain 13 into the scrubbing area.

If desired, a minor portion of the scrubbing stream can be fed into spray 10 to wash the inside of the riser and cap, thus avoiding solids buildup on these surfaces.

As the liquid scrubbing stream leaves the deentrainment area 2, it passes through a feed tray 14 and cascades down into the scrubbing area 3. Simultaneously, the gas stream flows up through the scrubbing area, moving laterally back and forth to pass the baffles, thus providing countercurrent contacting of the two streams. The rate of liquid flow into the top portion 5 of the scrubbing area is modulated to maintain a region where the liquid phase is continuous and the gas stream is bubbled therethrough creating a froth condition. This foamy slurry provides high liquid holdup, thus giving intimate contact of gas and liquid without the need for packing or perforated plates.

As previously set forth, the scrubbing area has been designed such that the free cross-sectional area of gas flow decreases toward the point where the liquid is introduced into the scrubbing area. This permits smooth operation with whatever number of trays desired at the point or points of liquid introduction in froth operation, while those below remain in spray operation.

In a scrubbing column, pressure drop typically varies as a function of gas and liquid superficial mass flow rates. The operating region for normal design is up to about 0.03 feet of liquid per foot of tray space. In this region, the gas phase is continuous throughout the column, and liquid showers down through it. The operating region of the invention is from 0.03 up to 0.3 feet of liquid per foot of tray space. In this region, part of the column is operating in a liquid-phase-continuous froth condition, with gas bubbling up through liquid. When the process is operated at 0.03 feet of liquid per foot of tray space, only the tray at the point of liquid introduction is operating at the froth condition while, if operated at 0.3, all the spaces between the trays are in the froth condition. Columns of normal design fill with froth from the bottom up, resulting in unstable operation with large short and long cycle changes in pressure drop as liquid holdup fluctuates.

The following equations are offered to help define the operating region of the invention.

Pressure drop through a dry baffle tray column (i.e., zero liquid flow) is described by Equation (1):

$$\Delta P_{Dry} = 2.1 \left(\frac{S}{S_o}\right) \left(\frac{G^2}{2 g_c \rho_G A^2}\right) \left(\frac{g_c}{g \rho_L Z}\right) \quad (1)$$

(feet liquid)/(feet tray space)

When liquid is present, the pressure drop is higher; the incremental increase in pressure drop, $\Delta P_{Wet}$, above that for zero liquid flow, is described by Equation (2):

$$F_G = -0.013 + 0.265 \left(\frac{\Delta P_{Wet}}{F_L \psi}\right) - 0.1529 \left(\frac{\Delta P_{Wet}}{F_L \psi}\right)^2 + 0.02902 \left(\frac{\Delta P_{Wet}}{F_L \psi}\right)^3 \quad (2)$$

(feet liquid)/(feet tray space)

The terms used in the above equations are defined in the following paragraphs:

$A$ = fractional free open area available for flow past tray, (feet)² open/(feet)² superficial $D$ = column inside diameter, feet $$F_G = G \sqrt{\frac{1}{g \rho_G (\rho_L - \rho_G)}} \quad \frac{S}{A^2}\text{-dimensionless gas flow}$$

$$F_L = L \sqrt{\frac{1}{g \rho_L (\rho_L - \rho_G)}} \quad \frac{S}{A^2}\text{-dimensionless liquid flow}$$

$g$ = acceleration due to gravity, $4.17 \times 10^8$ $4.17 \times 10^8$ (feet)/(hour)²

$g_c$ = gravitational force constant, $$\frac{[pound(mass)] (feet)}{[pound(force)] (hour)^2}$$

$G$ = gas flow, [pound (mass)]/(hour)[(foot)² superficial]

$$K_G a = \frac{G (NTU)}{M N Z P_{LM}}\text{ mass transfer coefficient as used here}$$

for low concentration of highly soluble gas

L = liquid flow, [pound (mass)]/(hour)[(foot)² superficial]

M = gas molecular weight, [pound (mass)]/pound mole

N = number of baffle trays in column $$NTU = \log_e \left[\frac{y_{in}}{y_{out}}\right] \quad \text{number of transfer units}$$

$$P_{LM} = \frac{P_{in} - P_{out}}{\log_e (P_{in}/P_{out})} \quad \text{log mean absolute pressure in column, atmospheres}$$

$$S = \frac{(\pi/4)D^2 [(1-A)_{above} + (1-A)_{below}] + \pi DZ}{(\pi/4)D^2 Z} =$$

$$\frac{(2 - A_{above} - A_{below})}{Z} + \frac{4}{D}$$

[total wetted surface, (feet)²]/[tray space volume, (feet)³]

$$S_o = \frac{\pi DZ}{(\pi/4)D^2 Z} = \frac{4}{D} \quad \frac{\text{[wall wetted surface, (feet)}^2\text{]}}{\text{[tray space volume, (feet)}^3\text{]}}$$

y = mole fraction of solute in the gas
Z = tray spacing, feet
$\mu_L$ = liquid viscosity, centipoise
$\rho_G$ = gas density, [pound (mass)]/(foot)³
$\rho_L$ = liquid density, [pound (mass)]/(foot)³
$\sigma$ = surface tension, dyne/centimeter $$\psi = \sqrt[3]{\left(\frac{73}{\sigma}\right)^2 \left(\frac{62.3}{\rho_L}\right)^2 \left(\frac{\mu_L}{1}\right)}$$

liquid physical properties adjustment factor

Equations (1) and (2) together define the hydrodynamic behavior of baffle tray columns throughout their practical operating range. Equation (1) indicates that the dry tray pressure drop is equal to 2.1 velocity heads (based on the actual free open area), multiplied by a "tortuosity coefficient", $(S/S_o)$. In typical large columns, the tray spacing would be about one-sixth of the column diameter; $S/S_o$ would then be equal to 2.5, and the dry tray pressure drop would be equal to 5.3 actual velocity heads. Equation (2) indicates that the ratio of the (wet incremental increase in pressure drop) divided by the (dimensionless liquid flow times a liquid physical properties adjustment) is an implicit cubic function of (the dimensionless gas flow).

Figure 2:
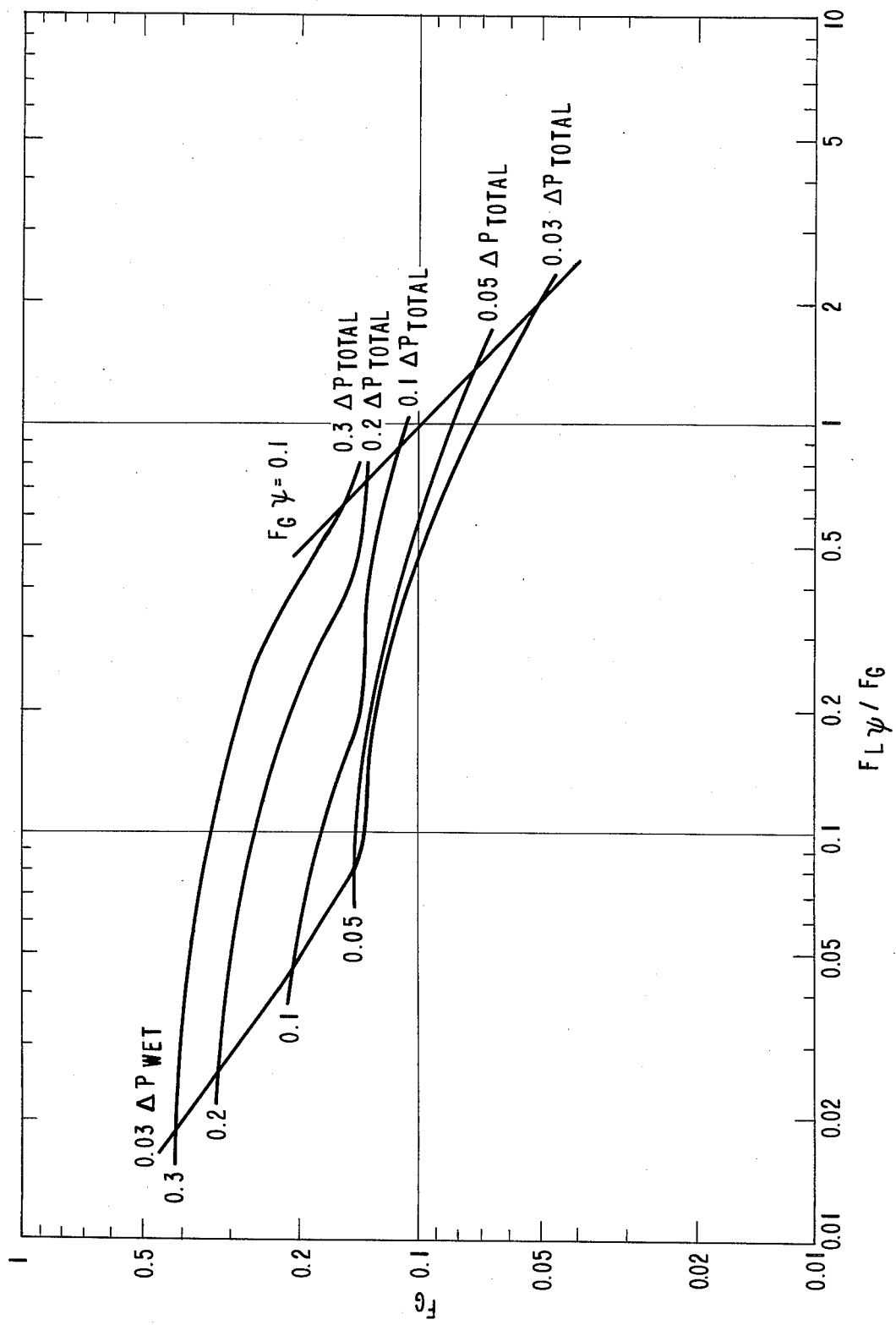
FIG. 2 illustrates the operating range for the scrubbing column of the invention.

Equation (2) is visualized by reference to FIG. 2. FIG. 2 shows iso-contours of [(total pressure drop) = (dry plus wet components)] in the coordinate system (dimensionless gas rate) versus [(dimensionless liquid/gas ratio) times a liquid physical properties adjustment].

Figure 6:
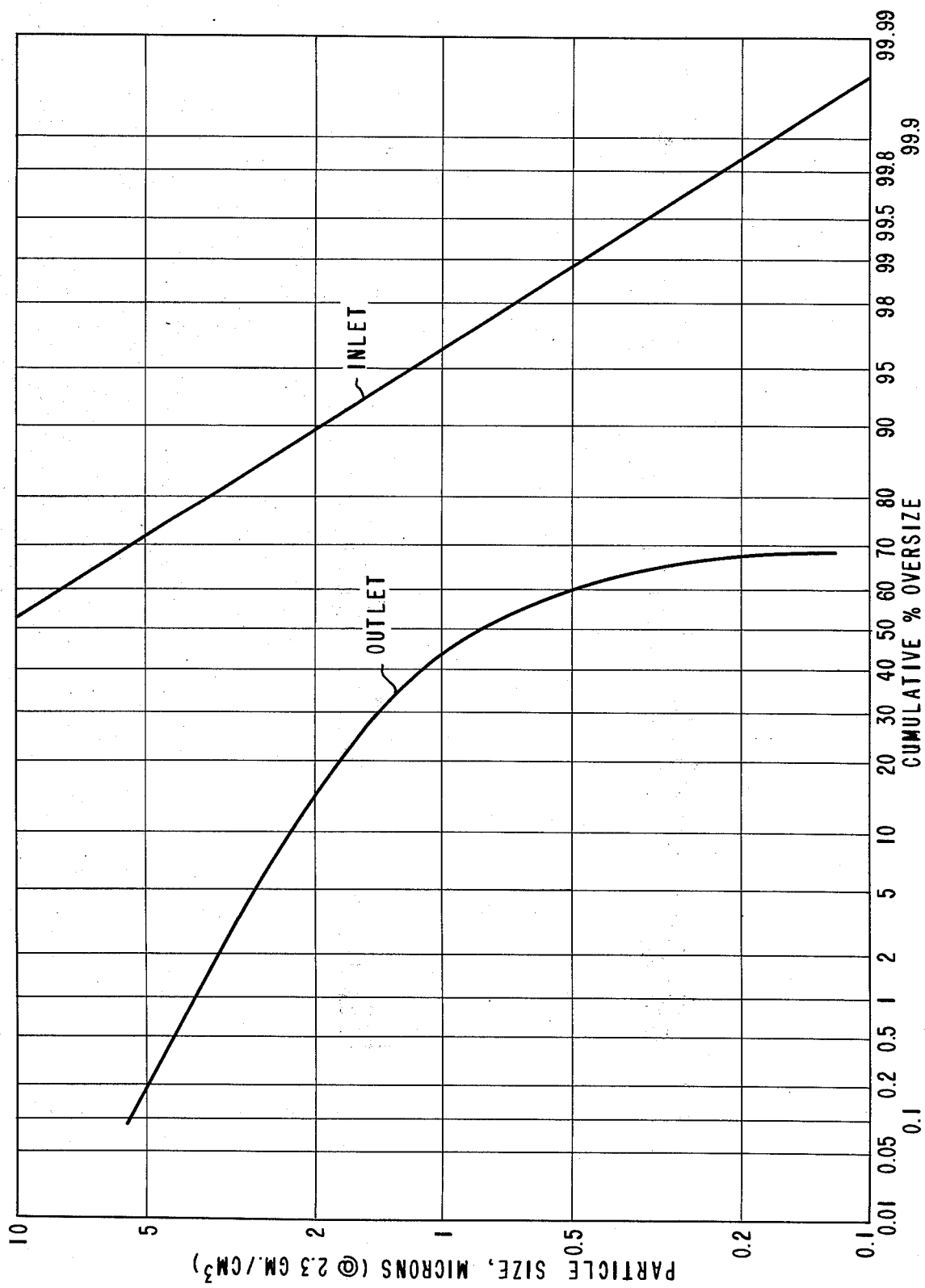
FIG. 6 is the measured outlet and effective inlet particle size distribution for Example 2.

The format of FIG. 2 is related to the Sherwood/Lobo/Leva correlation for pressure drop and flooding in packed columns, such as FIG. 6.26 in "Mass Transfer Operations" by Robert E. Treybal, Second Edition, McGraw-Hill, 1968. the ordinate in FIG. 2, $F_G$, is almost equal numerically to the square root of the Sherwood ordinate; the abscissa in FIG. 2, $F_L\psi/F_G$, is almost equal numerically to the Sherwood abscissa, for water-like liquid. Dry column pressure drop for FIG. 2 is calculated for a tray spacing of one-sixth of the column diameter.

The operating range of the invention is thus defined (see FIG. 2) as the region bounded above by the criterion of total column pressure drop less than 0.3 feet of liquid per foot of tray space; bounded below and to one side by the criterion of wet pressure drop increment greater than 0.03 feet of liquid per foot of tray space; and bounded to the other side by the criterion that $F_L\psi$ should be less than 0.1. This is two adjacent unexpected closed regions, the existence of which cannot be predicted from previous work. It is believed that the upper limit probably corresponds roughly to a froth height completely filling the space between trays; the lower limit probably corresponds to the transition from gas-phase-continuous (spray) to liquid-phase-continuous (froth) operation. The limit to the side is the maximum liquid flow which can be handled without unstable flooding of the column from the bottom, and probably corresponds to some change in the mechanism of drainage from tray to tray. There is some sort of internal hydrodynamic boundary corresponding to $F_G$ equal to 0.13; it apparently corresponds to a change in the mechanism of liquid holdup, and is involved in establishing the criterion that $F_L\psi$ be less than 0.1. It does not otherwise seem to affect scrubbing performance, except in that pressure drop tends to be rather erratic for operation within the $F_G$ range 0.12 to 0.14 (especially as the liquid rate $F_L\psi$ approaches 0.1).

Figure 3:
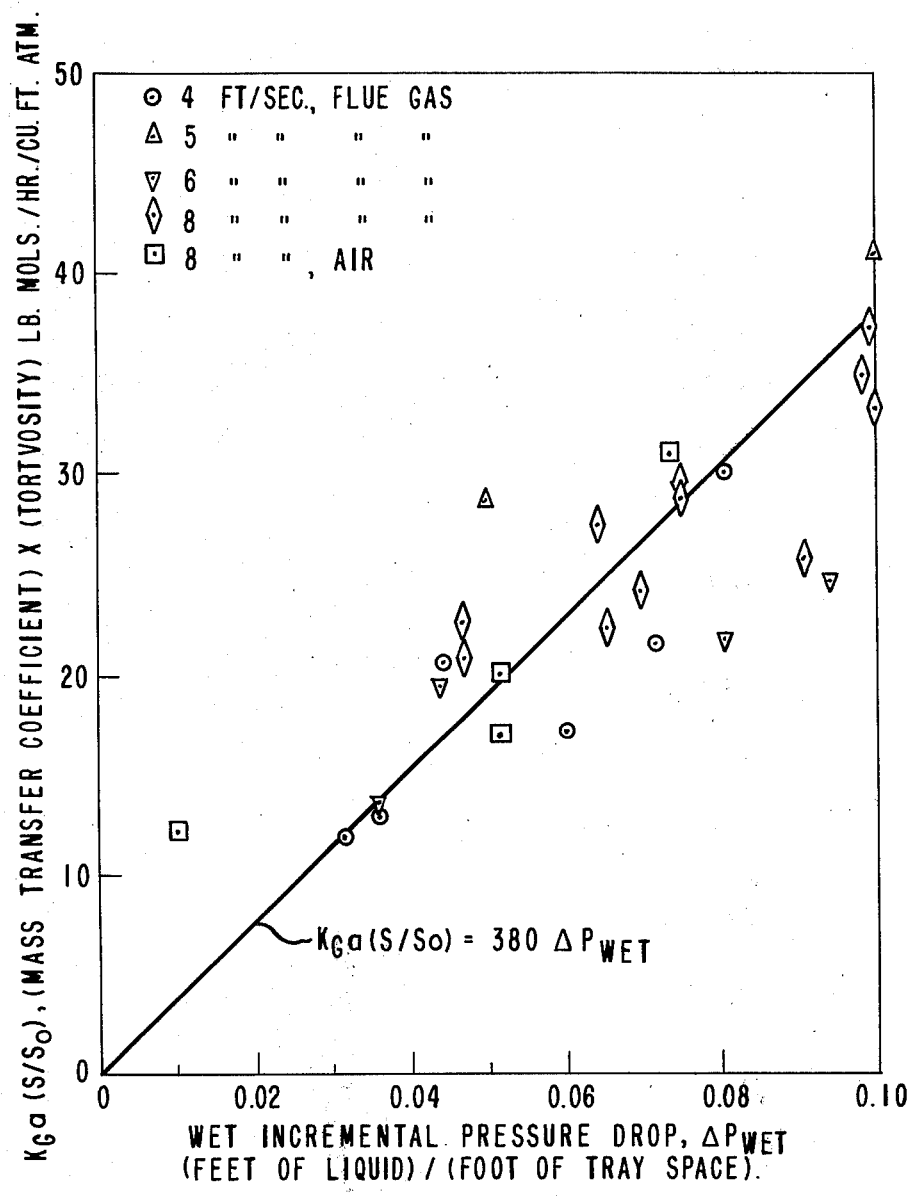
FIG. 3 illustrates the gas scrubbing performance for the scrubbing column of the invention when $SO_2$ was present in the gas stream.

Gas scrubbing performance is shown on FIG. 3, which is a plot of [(mass transfer coefficient) times a (tortuosity coefficient)] against (wet pressure drop increment). Equation (3) is the function shown as the fitted line through the data:

$$K_G a (S/S_o) = 380 (\Delta P_{Wet}) \tag{3}$$

Mass transfer coefficient was measured for the absorption of sulfur dioxide ($SO_2$) in two different columns, from air and from pulverized-coal-fired-boiler flue gas initially at about 200°C, into a water slurry of limestone, fly ash, and product solids (mainly calcium sulfate and calcium sulfite). Slurry concentration ranged between 6 and 18 percent by weight; temperature between 50° and 55°C; pH between 5.5 and 7.0; and dissolved sulfite leaving the scrubber between 1000 and 100 parts per million. Superficial gas velocities in the columns ranged between 4 and 9 feet per second; superficial liquid flows ranged between 20 and 100 gallons/1000 cubic feet; and absolute pressure ranged between 0.9 and 1.0 atmospheres. Various superficial velocity ranges are shown as dots of different shapes on FIG. 3. It is apparent that there is no particular correlation among the data other than that indicated by the fitted curve.

Mass transfer coefficient is not ordinarily correlatable as direct function of pressure drop alone. It ordinarily increases with increasing gas rate, and with increasing liquid rate, as does pressure drop. The functional relationships are usually quite different, so the flow rates cannot be cancelled out. The situation is reversed here; mass transfer coefficient correlates directly with (wet incremental pressure drop), and through it, with the gas and liquid flows as shown by Equations (1), (2) and (3). The iso-(pressure drop) contours of FIG. 2 are therefore equivalent to iso(mass transfer coefficient) contours, from which can be derived for any particular situation iso-(percent collection efficiency) contours.

Figure 4:
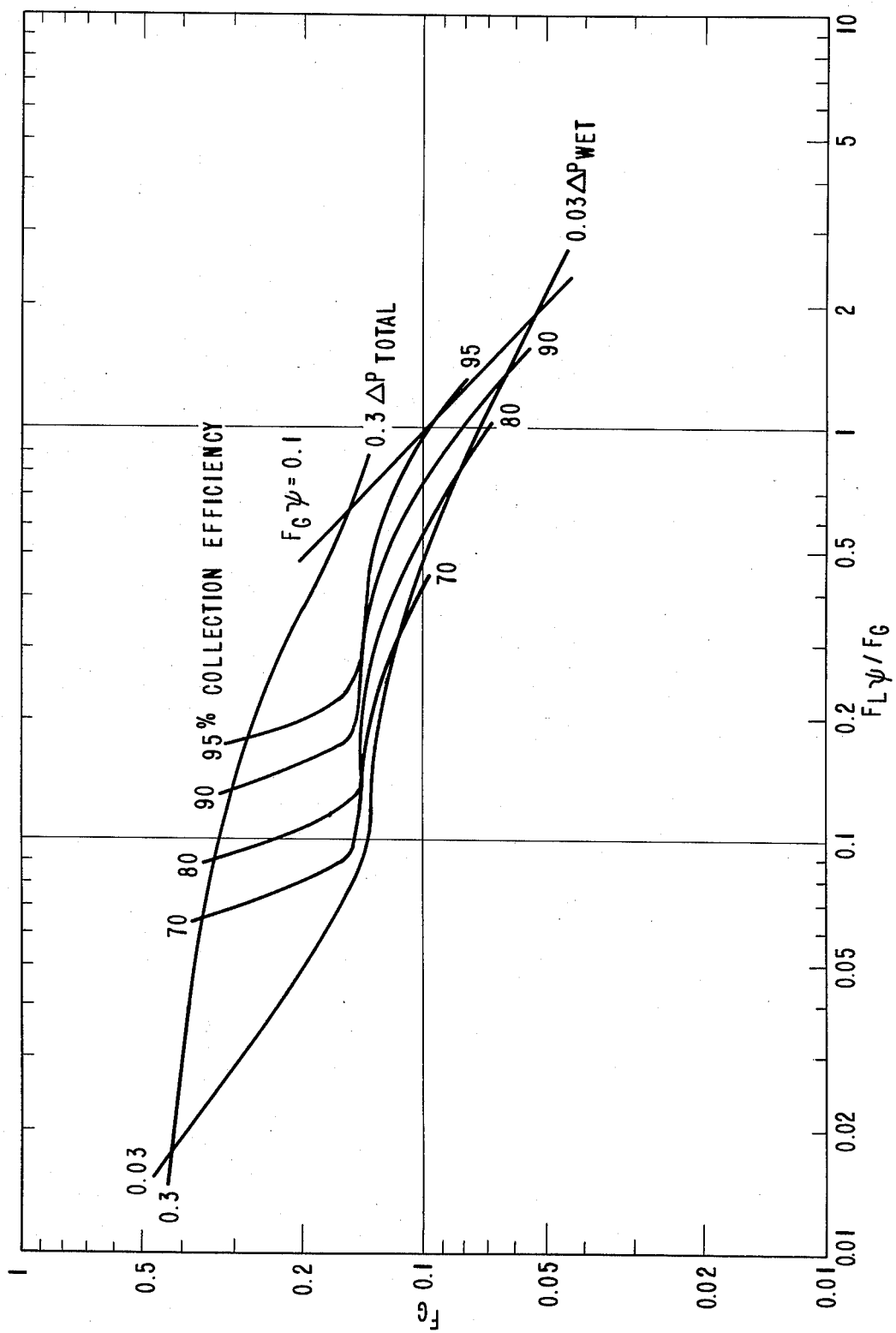
FIG. 4 illustrates various gas collection efficiencies for an embodiment of the process of the invention.

For example FIG. 4 illustrates an exemplary embodiment of the invention. This figure shows isocontours of (percent collection efficiency) in the coordinate system (dimensionless gas rate) versus [(dimensionless liquid/gas ratio) times a liquid physical properties adjustment)]. FIG. 4 corresponds to a disc-and-donut column 18 feet in diameter, with 10 trays 3 feet apart, 45% open at the top graduating to 60% open at the bottom, scrubbing boiler flue gas with limestone in water slurry under adiabatic closed-loop conditions. The pressure drop data of FIG. 2 are consistent with FIG. 4. The column might be designed for a minimum of 80% collection efficiency at 0.05 feet of water per foot of tray space (i.e., 18 inches water total pressure drop). The maximum design velocity would be at $F_G = 0.14$ (i.e., 16 feet/second superficial velocity) and $F_L\psi/F_G = 0.014$ (i.e., 3.6 gallons/1000 cubic feet). By adjustment of liquid rate, scrubbing efficiency could be obtained up to 92% as the gas flow is dropped to $F_G = 0.05$ (i.e., 6 feet per second), by raising the liquid to $F_L\psi/F_G = 2$ (i.e., 180 gallons per 1000 cubic feet), at which time the pressure drop would be about 0.03 feet/foot (11 inches water).

Smaller diameter columns, such as would be used for cleaning incinerator flue gases, could use more design point pressure drop per foot without getting into excessive overall pressure drop, and could handle gas flows down to less than 20 percent of the design point with increasing scrubber efficiency. Pressure drop adequate to get at least 70 to 80 percent collection efficiency for $SO_2$ will also give adequate collection of ash particles from concentrations typical of those of pulverized coal fired boiler flue gas.

EXAMPLE 1

The surprising increase in gaseous contaminant removal ($SO_2$ removal) when the scrubber is operated under a flooded regime is illustrated by the following example.

1500 acfm of flue gas (exit conditions) is cleaned by the column of FIG. 1. 45 gpm of a scrubbing slurry containing limestone is fed into the top of the column. This column is operating under the conditions of the invention. Measurement indicated $SO_2$ removal efficiency was 88.0% at 7.1 inches of water pressure drop.

Gas flow was reduced to 840 acfm exit the column, holding liquid flow constant at 45 gpm. Pressure drop decreased to 3.4 inches water, and $SO_2$ removal efficiency decreased to 78%. The column was then operating in a conventional spray mode. Liquid flow was then raised to 160 gpm, putting the column back into froth operation. Pressure drop went up to 7.0 inches water and $SO_2$ collection efficiency to over 96%.

EXAMPLE 2

The fractional collection efficiency for particulates is illustrated by the following example.

1160 acfm (exit conditions) of flue gas is cleaned by the column of FIG. 5. 32 gpm of a scrubbing slurry containing limestone is fed into a Venturi quencher, and 110 gpm to three feed points on the column. Venturi pressure drop was 0.7 inches $H_2O$; column pressure drop was 6.2 inches $H_2O$. This column is operating under conditions of the invention. $SO_2$ removal efficiency was about 95%. Overall particle collection efficiency was about 93% of an inlet grain loading of about 0.36 grains/ standard cubic foot.

Figure 7:
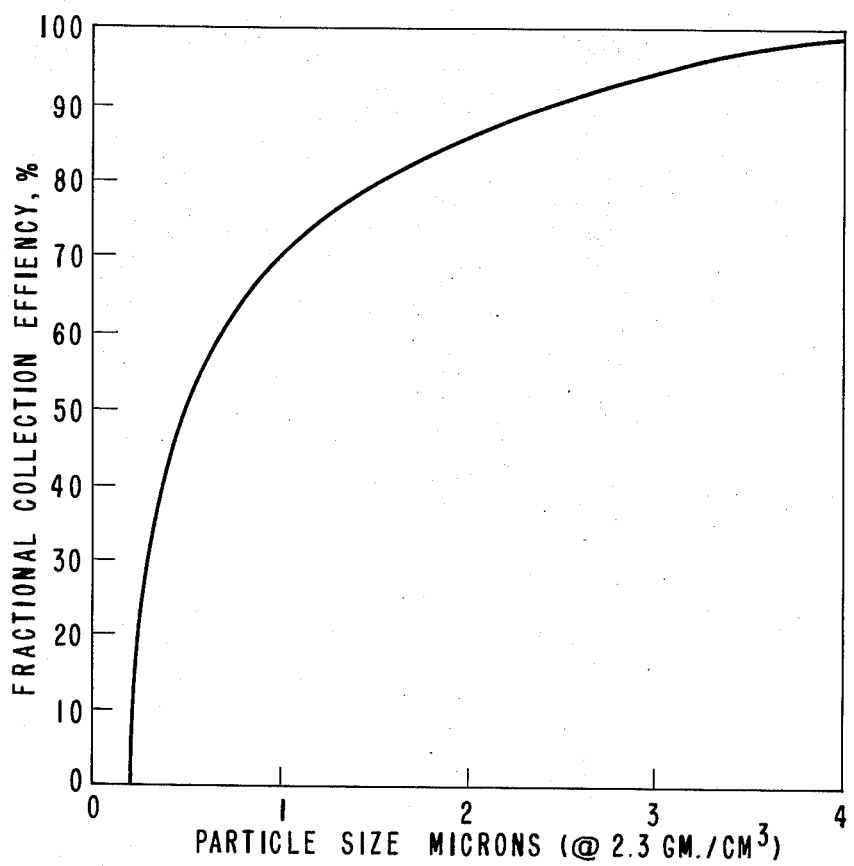
FIG. 7 is the fractional collection efficiency for particles of specific gravity 2.3 for Example 2.

Measured outlet and effective inlet particle size distributions are shown on FIG. 6; the corresponding fractional collection efficiency for particles of specific gravity 2.3 is shown on FIG. 7. The indicated cut size (particle size for 50% collection efficiency) of 0.5 microns is typical of Venturi scrubbers in similar service. $SO_2$ collection efficiency for such a Venturi scrubber would be about 40%, thereby requiring that the Venturi be followed by some sort of tray absorber in order to get adequate overall $SO_2$ removal.

We claim:

1. A scrubber for removing contaminants from a gas stream by contacting the gas with a scrubbing liquid to form a froth in which the scrubbing liquid constitutes the continuous phase comprising a vertical column having in fluid communication an upper liquid de-entrainment area, an intermediate scrubbing area and lower open area
   a. the de-entrainment area having means for de-entrainment of liquids from the gas stream, an outlet for the gas from which entrained liquids have been removed an inlet for feeding a liquid scrubbing stream into the deentrainment area and means for removing de-entrained liquids from the de-entrainment area;
   b. the scrubbing area having a plurality of baffle trays, means between the liquid scrubbing stream inlet and the topmost baffle tray for receiving deentrained liquid and discharging it on the top most baffle tray, the free open area of the topmost baffle tray being less than the free open area of the lower baffle trays; and
   c. the lower open area having an inlet for the contaminated gas stream and scrubbing liquid collection means communicating with a liquid outlet therefrom.

2. The apparatus of claim 1 wherein the baffle trays are alternating disc-and-donut trays, the bottom tray being a disc.

3. The scrubber of claim 1 in which the deentrainment area has liquid feed means by which scrubbing liquid is introduced in such manner as to flow down the walls of the de-entrainment area and the de-entrainment means.

4. The scrubber of claim 1 having further means for feeding liquid scrubbing stream into the scrubbing area below the topmost tray and means for withdrawing scrubbing liquid from a tray below the topmost tray and above the further liquid feed means.

5. The apparatus of claim 1 wherein the deentrainment means is a cap separator.

6. The scrubber of claim 5 wherein the means for feeding the liquid scrubbing stream is positioned to spray liquid upon the inner walls of the cap and riser of the cap separator.

* * * * *